Dec. 12, 1944.   D. W. GRIMES   2,364,631
METAL WORKING MACHINE
Filed Dec. 23, 1943    2 Sheets-Sheet 1
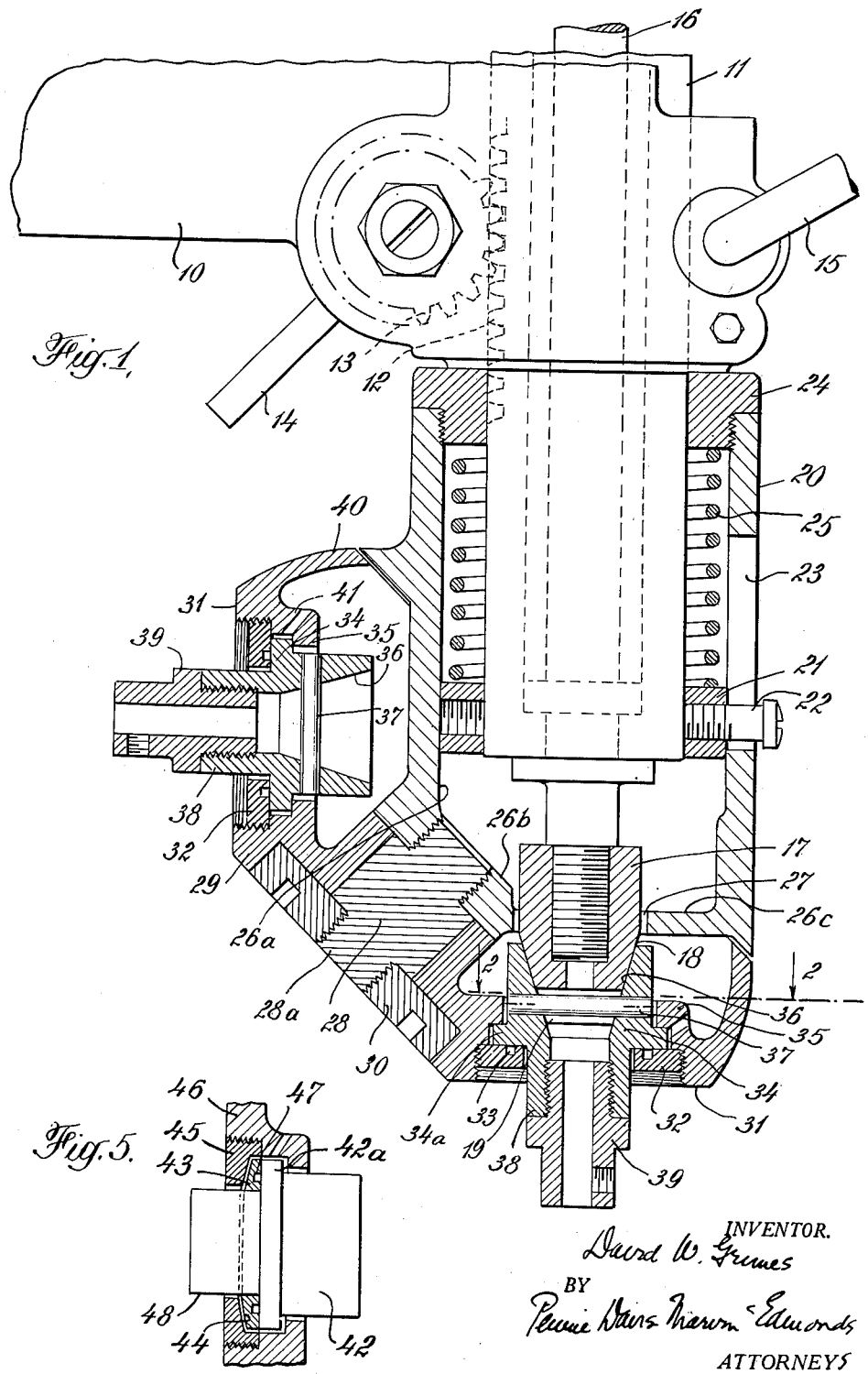
INVENTOR.
David W. Grimes
BY
Pennie Davis Marvin & Edmonds
ATTORNEYS Dec. 12, 1944.     D. W. GRIMES     2,364,631
METAL WORKING MACHINE
Filed Dec. 23, 1943     2 Sheets-Sheet 2
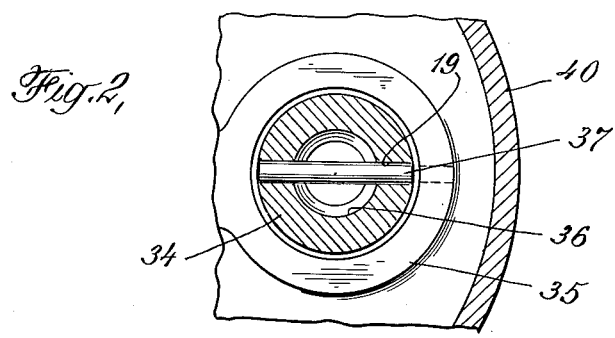
Fig. 2,
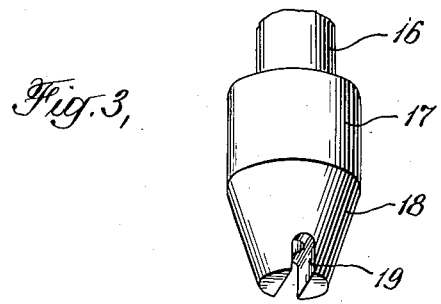
Fig. 3,
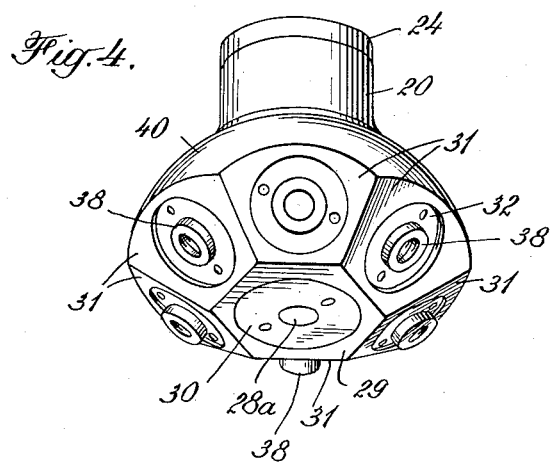
Fig. 4.
INVENTOR.
David W. Grimes
BY
Pennie Davis Marvin Edmonds
ATTORNEYS Patented Dec. 12, 1944

2,364,631

UNITED STATES PATENT OFFICE 2,364,631

METALWORKING MACHINE

David W. Grimes, New York, N. Y., assignor to Richard B. Fant

Application December 23, 1943, Serial No. 515,399

10 Claims. (Cl. 77—25)

This invention relates to metal working machines and is concerned more particularly with a novel tool head for use in such machines, which is provided with holders for a number of tools which can be brought into action selectively. The new tool head offers advantages over prior similar heads in that as a tool holder in the head is connected to the driving spindle, it is automatically centered and aligned with relation to the spindle, and the attainment of this result does not depend on accurate positioning of the head relative to the spindle or on exact mounting of the tool holders in the head. The new head, accordingly, need not be manufactured to the high standard of precision that would otherwise be necessary, it is easier to use, and its performance is not impaired by inexact manufacture or minor wear.

The tool head of the invention may be employed with machine tools of various types and may be used to hold tools for preparing various operations, such as drilling, boring, reaming, etc. For purposes of explanation, a form of the tool head suitable for use with a drill press will be illustrated and described in detail, but it will be evident that the utility of the head is not limited to that particular machine tool.

In prior multiple tool heads for drill presses and similar machine tools, it has been the practice to mount the tool head for rotation on a part of the machine and to arrange the tool holders in fixed bearings about the axis of rotation of the head. The tools are then brought selectively into operative relation to the spindle by rotation of the head and are connected, respectively, to the spindle by suitable clutch means. A latch device holds the head in the several positions that it must assume in order that the tool holders can be properly connected to the spindle. Proper centering of the selected tool relative to the spindle thus depends on the precision with which the head, the tool holders and their bearings, and the latch device are manufactured, and inaccurate mounting of the head on the machine or slight deformation of the parts caused by a blow or wear, may make it impossible to effect proper centering and alignment of the tool holders with relation to the driving spindle. Such misalignment results in poor work and wear on the parts.

In the new tool head, each tool holder is mounted in a bearing for limited movement in a plane transverse to the axis of rotation of the tool holder and the connection between the tool holder and the driving spindle is effected by interfitting parts on the spindle and holder, respectively. These parts are so formed that, in the operation of connecting a holder to the spindle, it is precisely aligned in its bearing with the axis of the spindle, such alignment being accompanied, when necessary, by a shift of the holder in its bearing. As the engagement of the interfitting parts on the spindle and tool holder is completed, the spindle and holder are locked together positively and the aligned relation of the parts is maintained throughout the use of the tool carried by the holder. The centering of a tool with relation to the spindle thus does not require the use of latching means for holding the head positively with relation to the spindle and the freedom of movement of the tool holders in their bearings compensates for inaccuracies in the manufacture and mounting of the head.

In addition to the novel features above mentioned, the new tool head departs in numerous other respects from prior constructions, as will be made clear in the detailed description to follow.

For a better understanding of the invention, reference may be had to the accompanying drawings, in which Fig. 1 is a view in vertical section through the new tool head as applied to a drill press with portions of the latter shown in elevation;

Fig. 2 is a sectional view on the line 2—2 of Fig. 1;

Figs. 3 and 4 are perspective views, respectively, of the driving member on the drill press spindle and of the tool head; and Fig. 5 is a sectional view of a modified tool holder bearing.

In the construction illustrated, the drill press includes an arm or standard 10 in which is movably mounted a tubular supporting member 11 provided with a rack 12 and movable vertically in the standard by means of a gear 13 meshing with the rack and operated by a handle 14. Another handle 15 mounted in the standard operates means by which the supporting member 11 may be secured in a fixed position with relation to the standard.

A driving spindle 16 is mounted in suitable bearings in the supporting member 11 and the spindle projects beyond the lower end of the supporting member and at its free end carries a driving member 17 threaded or otherwise secured in place. The driving member is formed with a frusto-conical surface 18 so that it tapers toward its free end, and a transfer slot 19 is formed in the free end of the member.

The tool head of the invention includes a sleeve 20 which encloses the end of the supporting member 11 below the standard 10 and is movable lengthwise of the member. Within the sleeve is a ring 21 encircling the supporting member and held in place thereon by screws 22, one of which projects outwardly through a slot 23 extending lengthwise of the sleeve and prevents rotation of the sleeve as well as limiting its endwise movement. The upper end of the sleeve is closed by a ring 24 threaded in place in the sleeve and encircling the supporting member 11. A coil spring 25 within the sleeve bears at its ends against rings 21 and 24 and tends to move the sleeve toward its uppermost position.

The sleeve is provided with walls 26a, 26b, 26c enclosing the lower end of the supporting member 11 and wall 26c is formed with an opening 27 through which the driving member 17 projects. Wall 26b of the sleeve lies inclined to the axis of the spindle 16 and a pin 28 is threaded into this wall. The pin has a central enlargement serving as a journal on which is rotatably mounted a head 29, and the head is held in place by a ring 30 threaded on the reduced end portion 28a of pin 28, the ring 30 overlapping the enlarged central section of the pin and a portion of the head encircling that section. The head is formed with a plurality of flat walls 31 and in the head illustrated, there are six of these walls. Each wall is formed with an aperture in the outer end of which is threaded a ring 32 having a flat inner bearing surface which may be provided with a circumferential channel 33 for receiving lubricant.

A tool holder 34 is mounted in each aperture in the head and the holder is formed with a circumferential flange 34a which rests on the inner surface of the bearing ring in its aperture and is held thereby in contact with the surface of an overhanging flange 35 formed as part of the wall of the head. The tool holder has a passage extending through it and the wall 36 at the inner end of the passage is shaped to form a recess in which the tapered end 18 of driving member 17 may be received with a snug fit. A pin 37 is mounted in aligned transverse bores in the wall of the tool holder and the central portion of the pin lies within slot 19 in driving member 17 when the tapered end of the latter is fully seated in the recess in the tool holder.

The tool holder has a portion 38 which extends through the aperture through ring 32 and is of less outer diameter than the diameter of the aperture. As the inner surface of the bearing ring 32 lies transverse to the axis of the tool holder, the difference between the diameters of the aperture in the bearing ring 32 and of the portion 38 of the tool holder extending through the aperture permits the tool holder to have a limited movement transverse to the axis of the aperture. The exposed portion 38 of the tool holder carries means for attachment of a tool to the holder and such means may include a suitable form of chuck, such as that conventionally indicated at 39.

The form of the rotary head 29 and its mounting on sleeve 20 is such that, as the head is rotated, the tool holders in the apertures in the head may be brought successively into position for alignment with the driving spindle. For this purpose, the supporting member 11 is raised until ring 24 closing the end of sleeve 20 is brought into contact with a part of the standard 10 and thereafter, as the upward movement of the supporting member continues, the sleeve is held stationary while the supporting member and spindle move upwardly until the lower end of the driving member 17 is above the plane of the top of any tool holder that may be brought into alignment therewith. With the parts in this position, the rotary head is turned on pin 28 to bring the tool holder of the selected tool into general alignment with the axis of the spindle, although such alignment need not be precise.

The supporting member is then lowered and, during such movement, spring 25 tends to hold ring 24 in engagement with the standard. The supporting member, accordingly, moves relatively to the sleeve and head and the tapered end of the driving member 17 starts to enter the recess in the tool holder. As it does so, the engagement of the tapered portion of the driving member with the wall 36 of the recess in the tool holder causes the latter to shift in its aperture into precise alignment with the axis of the spindle. During this operation, the spindle is being rotated by the usual means and ultimately, the driving member enters the recess sufficiently to permit pin 37 in the tool holder to enter slot 19 in the driving member. The tool holder and driving member are then positively connected together and lie in precise alignment. As the supporting member moves further down, ring 24 moves free of the standard and the spring thereafter acts, throughout the operation of the tool, to hold the driving member and tool holder in driving relation.

With the construction described, the limited freedom of the tool holders in the rotor head in a plane transverse to the axes of their respective apertures insures that, as each holder is connected to the driving spindle, it will be properly centered and aligned with relation thereto. This alignment, accordingly, does not depend on the precise location of the tool holder bearings in the head, on the accurate mounting of the head with reference to the spindle, or on the proper construction and functioning of a latch device. The new tool head, therefore, need not be manufactured to the high standard of precision that would otherwise be necessary and wear or accidental deformation of parts does not impair its performance.

In the device illustrated, the rotary head is formed with a wall 40 having an edge which lies close to a corresponding surface on the sleeve 20. An enclosed space is, accordingly, formed between the head and the sleeve and into this space may be introduced a quantity of lubricant which can flow through channels 41 to the bearing surfaces on the several rings 32 on which the tool holders rotate. Since the lubricant cannot escape, it need be supplied only infrequently and is continuously effective.

In Fig. 5, there is illustrated a modified tool holder bearing construction in which the flange 42a of the tool holder 42 is seated on a flat surface on a ring 43. The surface 44 of ring 43 lying opposite to the flat surface is convex and it is seated in a concave recess in the face of a ring 45 which corresponds to ring 32 and is threaded into a suitable aperture in the wall of the tool head 46. The ring 43 may have a circumferential lubricant channel 47 in its inner face on which flange 42a is seated.

With the Fig. 5 construction, the ring 43 is free to shift in the concave recess in ring 45 and the opening through ring 45 is of larger diameter than the outer diameter of the portion 48 of the tool holder which projects through the opening. With this arrangement, as a tool holder is moved to make a driving connection with the driving member on the spindle, the tool holder may shift in ring 45 and ring 43 may shift in its concave seat to insure that the axis of the tool holder will be in precise alignment with the axis of the driving spindle. After the driving connection is made, the tool holder being driven is supported on the flat surface of ring 43 and this surface lies at right angles to the axis of the driving spindle. The use of ring 43 may be desirable to compensate for wear in the mounting of the rotary head.

In the construction shown in both Figs. 1 and 5, the tool holder connected to the driving spindle is not only exactly aligned therewith but, during rotation, is supported on a surface at right angles to the driving spindle. The initial exact alignment of the tool holder and spindle is, therefore, maintained at all times during operation.

In the tool head as illustrated and described, the driving member on the spindle is formed with a frusto-conical end and each tool holder is provided with a recess of corresponding shape. It will be understood, of course, that these features could be reversed and each tool holder could have a frusto-conical portion receivable in a corresponding recess in the driving member.

I claim:

1. A multiple tool head for use in a metal working machine having a driving spindle carrying a driving member, the member tapering toward its free end, which comprises a freely rotatable head having a plurality of apertures, a tool holder mounted in each aperture for limited movement in a plane transverse to the axis thereof, each tool holder having a recess for receiving the tapered portion of the driving member with a tight fit, the engagement of the driving member in the recess in a tool holder causing alignment of the tool holder with the driving member, and means for moving the head relative to the spindle to effect driving engagement of the driving member and a tool holder and alignment of the latter with the spindle.

2. A multiple tool head for use in a metal working machine having a driving spindle carrying a driving member, the member tapering toward its free end, which comprises a freely rotatable head having a plurality of apertures, a tool holder mounted in each aperture for limited movement in a plane transverse to the axis thereof, each tool holder having a recess for receiving the tapered portion of the driving member with a tight fit, the engagement of the driving member in the recess in a tool holder causing alignment of the tool holder with the driving member, and a spring tending to move the head relative to the spindle to effect driving engagement of the driving member and a tool holder and alignment of the latter with the spindle.

3. A multiple tool head for use in a metal working machine having a supporting member and a driving member tapering toward its free end, which comprises a sleeve adapted to be mounted on the supporting member for movement lengthwise thereof, a rotatable head mounted on the sleeve and having a plurality of apertures, a tool holder mounted in each aperture, each tool holder having a circumferential flange, means engaging opposite faces of said flange and permitting the tool holder to have a limited freedom of movement in a plane transverse to the axis thereof only, each tool holder having a recess in which the tapering portion of the driving member may be received with a tight fit, and a spring adapted to encircle the supporting member and to act on the sleeve to move the latter to bring a selected tool holder into engagement with the tapered end of the driving member.

4. A multiple tool head for use in a metal working machine having a supporting member and a driving spindle mounted for rotation therein and carrying a driving member tapering toward its free end, which comprises a sleeve adapted to be mounted to enclose the end of the supporting member for movement lengthwise thereof, a rotatable head mounted on the sleeve having a plurality of apertures movable selectively on rotation of the sleeve to a position in which the axis of the selected aperture is in alignment with the axis of the spindle, a tool holder mounted in each aperture for limited movement in a plane transverse to the axis of the aperture, the tool holder having a recess in its inner end in which the tapered end of the driving member may be received, a bearing ring in each aperture having a bearing surface on which the associated tool holder is free to rotate, the tool holder having a portion projecting through the ring, means carried by the projecting portion of each tool holder for attachment of a tool, and a spring acting on the sleeve to move it relatively to the supporting member to cause driving engagement of a selected tool holder and the driving member on the spindle.

5. A multiple tool head for use in a metal working machine having a supporting member and a driving spindle mounted for rotation therein and carrying a driving member tapering toward its free end, the driving member being provided at said end with a transverse slot, which comprises a sleeve adapted to be mounted on the supporting member for movement lengthwise thereof, a rotatable head mounted on the sleeve and having a plurality of apertures, a tool holder mounted in each aperture for limited freedom of movement in a plane transverse to the axis of the aperture, each tool holder being selectively movable by rotation of said head into general alignment with the axis of the spindle when the sleeve is in one position relative to the supporting member, a recess in each tool holder in which the tapered end of the driving member is receivable, a pin extending across the recess and entering the slot in the driving member when the latter is fully seated in the recess, and a spring adapted to encircle the supporting member and to act on the sleeve to effect engagement of the driving member with one of the tool holders.

6. A multiple tool head for use in a metal working machine having a supporting member and a driving spindle mounted for rotation therein and carrying a driving member tapering toward its free end, which comprises a sleeve adapted to be mounted on the supporting member for movement lengthwise thereof, a ring adapted to be mounted fast on the supporting member within the sleeve, a spring bearing on the ring and engaging a portion of the sleeve for holding the sleeve in a particular relation to the supporting member, a head mounted for rotation on the sleeve and having a plurality of apertures arranged in a circle about the axis of rotation of the head, a tool holder mounted in each aperture for limited movement in a plane transverse to the axis of the aperture, and a bearing ring in each aperture through which the tool holder extends and on which it is supported for rotation, the tool holder having a recess in which the tapered end of the driving member is receivable.

7. A multiple tool holder for use in a metal working machine having a supporting member movable longitudinally in a standard and a driving spindle mounted for rotation in the supporting member and carrying a driving member tapering toward its free end which comprises a sleeve adapted to be mounted on the supporting member for movement lengthwise thereof, a spring urging the sleeve in one direction along the supporting member, the spindle projecting beyond the end of the supporting member and the driving member extending through an aperture in the end of the sleeve, a head mounted for rotation on the sleeve and provided with a plurality of apertures defined in part by rings, each ring having a bearing surface lying substantially in a plane at right angles to the axis of the aperture, a tool holder mounted in each aperture and supported for rotation by the ring, the tool holder having a limited freedom of movement on the ring in a plane transverse to the axis of the aperture and having a recess adapted to receive the tapered end of the driving member with a snug fit, the head and sleeve cooperating to define a closed chamber for lubricant, and channels in the body of the head through which lubricant may pass to the bearing surface of each bearing ring.

8. A multiple tool head for use in a metal working machine having a driving spindle carrying a driving member, the member tapering toward its free end, which comprises a freely rotatable head having a plurality of apertures, a ring mounted in each aperture and formed with a concave inner face surrounding the aperture, a bearing ring having a convex face seated in the inner face of the first ring and having a flat face opposite to its convex face, a tool holder having a flange resting on the flat face of the bearing ring and having a portion extending through the rings and of less diameter than the aperture through the first ring, the tool holder having a recess for receiving the tapered portion of the driving member with a tight fit, the engagement of the driving member in the recess in a tool holder causing alignment of the tool holder with the driving member, and means for moving the head relative to the spindle to effect driving engagement of the driving member and a tool holder and alignment of the latter with the spindle.

9. A multiple tool head for use in a metal working machine having a supporting member and a driving spindle mounted for rotation therein and carrying a driving member tapering toward its free end, which comprises a sleeve adapted to be mounted on the supporting member for movement lengthwise thereof, a rotatable head mounted on the sleeve and having a plurality of apertures, a tool holder mounted in each aperture for limited freedom of movement in a plane transverse to the axis of the aperture, each tool holder being selectively movable by rotation of said head into general alignment with the axis of the spindle when the sleeve is in one position relative to the supporting member, a recess in each tool holder in which the tapered end of the driving member is receivable, means connecting the driving member and tool holder for rotation in unison when the driving member is fully seated in the recess, and a spring adapted to encircle the supporting member and to act on the sleeve to effect engagement of the driving member with one of the tool holders.

10. A multiple tool head for use in a metal working machine having a driving spindle carrying a driving member which comprises a freely rotatable head having a plurality of apertures, a tool holder mounted in each aperture for limited movement in a plane transverse to the axis thereof, each tool holder having a recess for receiving the driving member, the engagement of the driving member in the recess in the tool holder causing alignment of the tool holder with the driving member, positive means connecting the driving member and tool holder for rotation in unison when the driving member has entered the recess in the tool holder, and means for moving the tool head relative to the spindle to effect driving engagement of the driving member and a tool holder and alignment of the latter with the spindle.

DAVID W. GRIMES.